United States Patent [19]

Settle, Jr.

[11] 4,330,563

[45] May 18, 1982

[54] PROCESS FOR MAKING AN EDIBLE FROZEN FOOD PRODUCT

[76] Inventor: Edwin B. Settle, Jr., 2864 Whitney Rd., Clearwater, Fla. 33520

[21] Appl. No.: 146,792

[22] Filed: May 5, 1980

[51] Int. Cl.$^3$ .............................................. A23G 9/04

[52] U.S. Cl. .................................... 426/389; 426/414; 426/421; 426/515

[58] Field of Search ............... 426/104, 658, 393, 414, 426/580, 524, 91, 134, 660, 515, 389, 421; 62/60

[56] References Cited

U.S. PATENT DOCUMENTS

| | | | |
|---|---|---|---|
| 2,045,730 | 6/1936 | Schefman et al. | 426/389 |
| 2,235,964 | 3/1941 | Meyer et al. | 426/104 |
| 2,877,121 | 3/1959 | Anderson et al. | 425/515 |
| 3,244,528 | 4/1966 | Torr | 426/658 |
| 3,809,774 | 5/1974 | Raitt | 426/393 |
| 4,076,207 | 2/1978 | Austin | 426/389 |
| 4,225,627 | 9/1980 | Moore | 426/389 |

OTHER PUBLICATIONS

Freezing & Canning Cookbook, Nichols, Doubleday Co., Garden City, N.Y., 1963, p. 73.

*Primary Examiner*—Hiram Bernstein
*Attorney, Agent, or Firm*—Ronald E. Smith

[57] ABSTRACT

A milk, water, and honey composition, a water and honey composition, a process for preparing the former, and an apparatus for performing said process.

A square in configuration, flexible blank of sheet material is inserted into the cavity of a flower-trumpet shaped mold and made to conform to the shape of the internal walls of the mold. The former composition is poured into the mold, a handle means is inserted into the composition, and the composition is frozen. The product is removed from the mold, and the blank of sheet material is unwrapped therefrom and used to collect melting portions of the product, if the same should commence melting prior to consumption thereof.

2 Claims, 3 Drawing Figures

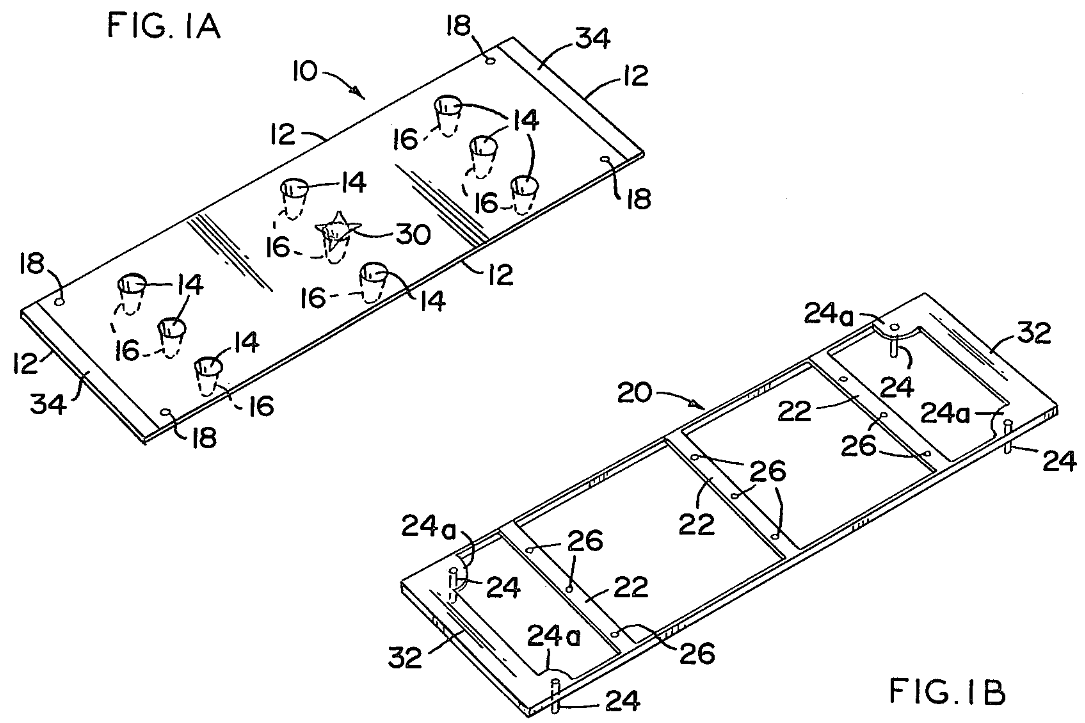
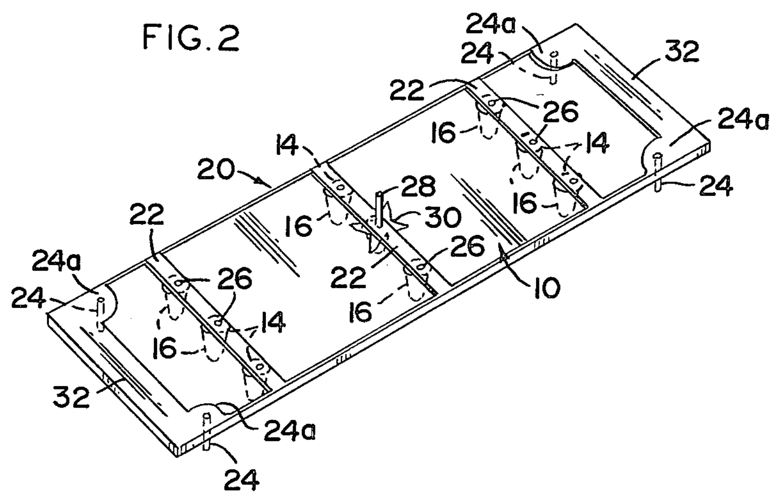
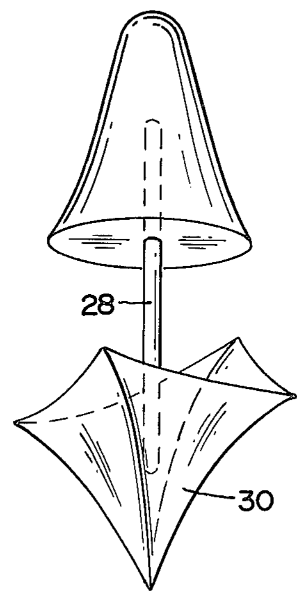
FIG. 3

PROCESS FOR MAKING AN EDIBLE FROZEN FOOD PRODUCT

BACKGROUND OF THE INVENTION

1. Field of the Invention.

This invention relates generally to compositions comprising milk, honey, and water, or honey and water, and more specifically to compositions that provide frozen edible treats and liquid sweeteners that are devoid of artificial additives, such as processed cain.

2. Description of the Prior Art.

The following patents were located in the course of a search of U.S. Pat. Nos.: 752,359 to Reed; 1,409,435 to Barwell; 1,854,430 to Stratton; 2,014,902 to Lipson; 2,621,128 to Webb et. al.; 2,690,972 to Bradshaw; 3,244,528 to Torr; 3,780,185 to Fields; and 3,879,567 to Verner.

The products described in the above-listed disclosures are low in moisture content, and usually granular in form, and therefore do not appear to be easily consumed or provided in a form that will encourage the consumption of honey-based products, although such products perform their intended purposes well.

SUMMARY OF THE INVENTION

A need is therefore seen to exist for a food product or products that include honey in a readily edible form so that the consumption of honey-based products will be encouraged.

A frozen treat comprising one part honey, two parts milk, and four parts water is prepared by pouring the mixture, in its liquid state, into a mold that has the shape of a flower trumpet. The wrapper for the product is placed into the mold prior to the charging of the mixture thereinto, so that when the product is removed from the mold, the wrapper can be peeled from the product and used to collect droplets of melted product, if any.

A liquid sweetener comprising substantially natural flavoring and purified water is admixed with honey so that the final product contains about ten% honey and constitutes a free-flowing liquid.

It is therefore seen to be an object of this invention to provide tasteful honey compositions so that persons desiring sweet or sweetened food products may consume the same in the absence of the ingestion of harmful processed cain or beet sugar-containing products.

Another object is to provide apparatus useful for mass-producing a honey-based composition so that the same can be provided to consumers on an economical basis, thereby further encouraging the consumption of honey-based products.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1A is a perspective view of the base plate means from which depends a plurality of the mold means for shaping the frozen food product that forms a part of this invention.

FIG. 1B is a perspective view of the preferred frame assembly that is cooperatively positioned relative to the base plate means during the course of the inventive process.

FIG. 2 is a perspective view showing the base plate means and the frame assembly in position, and further shows the handle means held in proper orientation by the frame assembly.

FIG. 3 is a perspective view of the frozen product, showing the disposition of the wrapper as a drip-collecting means.

DETAILED DESCRIPTION OF THE PREFERRED EMBODIMENT

Referring now to FIG. 1A, it will be seen that a generally flat, rectangular base plate means, designated 10 as a whole, of predetermined dimension comprising specific borders 12 which define the peripheral boundaries of the base plate means 10, has formed within said boundaries 12 a plurality of apertures 14 of predetermined configuration, each aperture 14 contiguous to at least one other aperture 14 formed in said base plate means 10.

Mounted about the perimeter of each aperture 14 and depending therefrom are a plurality of upwardly-opening, parabolic in vertical section mold means 16 that are individual to different ones of said apertures 14.

Each mold means 16 is specifically structured to provide the appearance of the trumpet portion of a honeysuckle flower (not shown), the trumpet portion thereof being disposed on the distal free end of the flow stem.

Peg-receiving apertures 18 are formed in the corners of the base means 10, as shown in FIG. 1A.

FIG. 1B shows the frame assembly 20 that is employed to retain the perforated strips 22 in mutually parallel relation to one another. The strips 22 are equispaced relative to one another and are specifically disposed to bisect the open end 14 of the mold means 16 when frame assembly 20 is cooperatively positioned relative to base plate 10 by inserting the pegs 24 of the frame 20 into corresponding ones of the peg-receiving apertures 18. The perforations 26 are specifically disposed within each strip 22 so that each perforation 26 coincides with the axis of symmetry of different ones of the trumpet-shaped molds 16.

Each of the perforations 26 are configured and dimensioned to receive therethrough a wooden or plastic or other material handle means 28 of the type commonly associated with popsicles, fudgsicles, and the like.

A square in plan view blank of sheet material 30 is inserted into the trumpet-shaped cavity of the mold means 16 and made to conform thereto prior to charging the inventive composition into the mold 16, as shown in FIG. 1A. When so inserted, the material 30 will completely line the inner walls of the mold 16, and the four corners of the material 30 will protrude out of the cavity of the mold 16 as shown in FIG. 1A. Only one blank of sheet material 30 is shown in FIG. 1A, to simplify the drawing.

After the mold has been filled with the novel composition, the frame assembly 20 is placed into overlying relationship with the base plate 10 in the manner above-described, and wooden or plastic handles 28 are inserted through the perforations 26 carried by the strips 22, and sufficiently embedded in the composition, although an adequate portion thereof is allowed to protrude therefrom to serve as a handle means when the product is consumed. To simplify FIG. 2, only one handle means 28 is shown.

The perforations 26 are proportioned to snugly retain the handles 28 in an upstanding configuration, i.e., to retain the handles 28 in a plane normal to the plane of the base plate means 10.

With the handles 28 positioned as aforesaid, the base plate 10/frame assembly 20 combination is placed into a refrigerated chamber (not shown) so that the composition will freeze. After the product has frozen, frame assembly 20 is removed from the base plate 10 and the product is then easily removed from the molds 16 by lifting the same therefrom by manipulating handle 28.

Disengagement of the frame 20 from the base plate 10 is facilitated by means of a flange 32 that forms a part of the frame 20 and which is co-planar therewith. The flange 32 extends beyond a co-extending, substantially parallel flange 34 that is provided as a part of the base plate 10 so that the base plate 10 can be suspended between opposing, co-planar, inwardly projecting ridges, not shown, provided as a part of the freezer compartment in which the base plate 10/frame assembly 20 combination is placed.

The inventive process consists of the following steps: purified or boiled water is prepared in a predetermined amount. A quantity of homogenized milk equal to one-half the amount of purified water is added thereto, and a quantity of de-combed honey equal to one-half the amount of milk is admixed therewith. A mixture so prepared will constitute one part honey, two parts milk, and four parts water. For a more distinctive tasting final product, the amount of water may be halved, which results in a mixture consisting of one part de-combed honey, two parts homogenized milk, and two parts purified water, all parts being stated in terms of volume.

The mixture is placed in a blending apparatus, stirred until thoroughly admixed, and charged into the material 30-lined inner walls of the mold 16, as aforesaid.

No special apparatus is required for the preparation of the liquid sweetener product. A mixture comprising approximately 10%–20% honey, 80–90% water, & natural flavoring is mixed in a blending apparatus. The resulting product is a free-flowing liquid that can be readily dispensed from conventional dispensers for liquids of low viscosity.

It will thus be seen that the objects set forth above are efficiently attained, and since certain changes can be made in the above construction without departing from the scope of the invention, it is intended that all matters contained in the foregoing description or shown in the accompanying drawings shall be interpreted as illustrative, and not in a limiting sense.

Now that the invention has been described,

That which is claimed is:

1. A process for making an edible frozen food product, comprising the steps of providing a die having at least one cavity formed therein, shaping said cavity so that it has a generally hyperbolic configuration when viewed in vertical cross section, lining said cavity with a blank of flexible sheet material of generally square configuration so that the respective corners of said sheet material protrude upwardly of the plane of said die, in substantially equidistantly spaced, circumferentially disposed, relation to one another, charging an edible, liquid-state, freezable substance into said cavity and filling said cavity to its rim, placing a slotted carrier strip member having a length greater than the diameter of said cavity in overlying and substantially bisecting relation to the upwardly opening end of said filled cavity, inserting a handle member through said slot formed in said carrier strip member so that the inserted portion of said handle member is embedded within said edible product and aligning said handle member so that it is disposed in substantially upstanding relation to said die, freezing said freezable product so that the embedded portion of said handle member is rigidly maintained therein, removing said carrier strip member, removing said frozen product from said cavity by lifting said handle member, and exposing said product for consumption by removing said sheet material therefrom by grasping the protruding corners of said sheet material and peeling said sheet material from said product.

2. The process of claim 1, further comprising the step of inserting the free end of said handle member into the cavity defined by the sheet material that was removed from its wrapping relation with said product so that the generally hyperbolic-in-vertical-cross-section cavity of said sheet material provides a drip-collecting means for the transient retention of melted portions of said product that may appear prior to consumption of said product.

* * * * *